Figure 1:
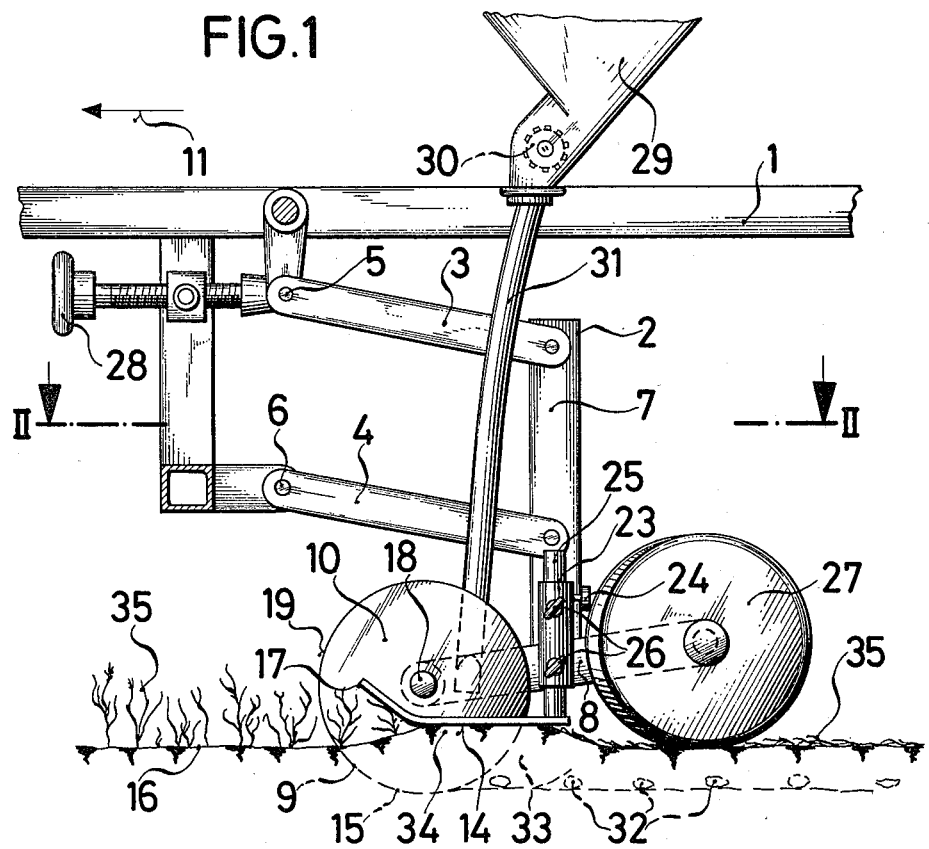

United States Patent [19]
Dreyer

[11] 4,407,207
[45] Oct. 4, 1983

[54] DRILL HAVING DISK FURROW OPENERS

[75] Inventor: Heinz Dreyer, Hasbergen-Gaste, Fed. Rep. of Germany

[73] Assignee: Amazonen Werke H. Dreyer, Hasbergen-Gaste, Fed. Rep. of Germany

[21] Appl. No.: 445,827

[22] Filed: Dec. 1, 1982

Related U.S. Application Data

[63] Continuation of Ser. No. 27,321, Apr. 5, 1979, abandoned.

[30] Foreign Application Priority Data

Apr. 6, 1978 [DE] Fed. Rep. of Germany ....... 2814883

[51] Int. Cl.$^3$ ............................................... A01C 5/00
[52] U.S. Cl. ...................................... 111/85; 111/88; 172/387; 172/392; 172/574; 172/764
[58] Field of Search ............... 172/536, 764, 394, 576, 172/738, 387, 727, 665, 742, 574, 575, 603, 392, 394, 388; 111/85–88

[56] References Cited

U.S. PATENT DOCUMENTS

| | | | |
|---|---|---|---|
| 150,450 | 5/1874 | Wiard | 172/387 |
| 610,316 | 9/1898 | Arnett | 111/87 |
| 610,316 | 9/1898 | Arnett | 111/87 |
| 633,216 | 9/1899 | Pretsman | 111/85 |
| 897,839 | 9/1908 | Mahoney | 172/738 |
| 1,054,235 | 2/1913 | Pattison et al. | 111/87 |
| 1,392,732 | 10/1921 | Zarmstorf | 172/394 |
| 1,392,732 | 10/1921 | Zarmstorf | 172/394 |
| 1,445,705 | 2/1923 | Nuernberger | 172/394 |

FOREIGN PATENT DOCUMENTS

| | | | |
|---|---|---|---|
| 204578 | 8/1956 | Australia | 111/86 |
| 1936685 | 1/1970 | Fed. Rep. of Germany . | |
| 2384436 | 11/1978 | France | 111/87 |
| 576985 | 10/1977 | U.S.S.R. | 111/88 |

*Primary Examiner*—James R. Feyrer
*Assistant Examiner*—Danton D. DeMille
*Attorney, Agent, or Firm*—Sprung, Horn, Kramer & Woods

[57] ABSTRACT

Seed drill (FIG. 2) having share disks 10, and press wheels 27 which determine the depth of penetration of the disks. Runners 13 and disposed on the outer sides of the disks for enabling the soil particles or cohering pieces of soil lifted by the disks to fall back unturned into the seed furrows produced by the disks.

6 Claims, 2 Drawing Figures

DRILL HAVING DISK FURROW OPENERS

This is a continuation, of application Ser. No. 27,321, filed Apr. 5, 1979, now abandoned.

The invention concerns a drill having disk furrow openers which are rotatably mounted on mountings disposed movably in a vertical plane and whose individual disks are set at an acute angle to the line of travel.

Such a drill has already been disclosed by German Offenlegungsschrift 1,936,685. In this drill, the disk furrow openers consist each of two share disks disposed side by side at a distance from one another, behind each of which a press wheel, rotatably mounted on the same mounting, is situated for the closing of the seed furrows produced by the individual share disks.

In spite of this arrangement, the known drill has the disadvantage that the seed furrows are not under all circumstances closed up again such that all of the seeds placed in the seed furrows are covered with earth to a sufficient extent for their uniform germination. Particularly in the case of relatively great operating speeds or in the case of relatively high soil moisture content, larger or smaller pieces of soil are raised up by the outer sides of the share disks running at an angle to the line of travel, and they are turned and thrown away from the seed furrows such that they can no longer be reached by the press wheels, and the seed furrows remain open behind these press wheels for shorter or longer distances. Particularly in lands where the rainfall is poor during the planting period or during the entire growing season, these open parts of the furrows dry out so rapidly that the uncovered seeds in them lose contact with the soil moisture and are unable to develop into usable plants, and great harvest losses are unavoidable.

Especially when the so-called direct planting method is used, which is applied preferentially in countries of poor rainfall which are the ones for which the known drill is said to be especially suitable, there is still another disadvantage. It is common in these methods, for the attainment of an unimpeded germination of the seed, to kill off the vegetation that is present in the fields which have been left unworked since the previous harvest, using herbicides for the purpose either shortly before planting or shortly before the germination of the seed. These chemicals, however, must not come in contact with the seed if loss of germination is to be avoided. Now, since the soil particles acted upon the disks are turned over by the lifting followed by falling, when the herbicide is spread prior to planting, the weeds contaminated with these chemicals fall down onto the soil or directly into the seed furrows and some are pressed by the press wheels into the vicinity of the deposited seeds. Thus, relatively great amounts of herbicides can diffuse into the soil area intended for the crop seeds to be germinated, so that the seedlings necessarily come in contact with them and their development will be at least greatly impaired.

If, however, the herbicides are spread after planting and shortly before the germination of the seed, for the purpose of killing off also the weeds that have developed from the weed seeds shaken down by the disk furrow openers during the planting operation, the seeds lying uncovered in the open stretches of seed furrow cannot be prevented from coming directly in contact with the herbicides. As a result, germination losses again lead to reduced harvests.

Furthermore, a drill equipped with drag shares has been made known by the German patent, in which runners are disposed on the mountings of these drag shares, and their sliding surfaces are situated above the bottom edge of the drag share. Each of these runners has a forward portion bent upward and forward, which is situated ahead of the drag shares and is mounted for tilting on its mounting. Behind this forward portion the runner is forked and extends far to the rear past both sides of the drag share. These runners are said to serve the purpose of smoothing the furrow made by the chopper disposed in front of the drag shares and, by means of a screw provided between them and the mountings, to be able to adjust the depth desired for the drag share. By means of the downwardly extending projections provided at the rear ends of the runners, the seed furrow produced by the drag shares is furthermore to be closed up again.

It is disadvantageous in this drill that the strip of soil ahead of the plowshare has already been torn open and turned by the chopper. When the drill is used in the direct planting process and herbicides are spread prior to planting, the same harmful effect of these chemicals on the seed is produced as in the previously described known drill. Since the runners are mounted pivotingly with their forward end on the mountings, when a greater working depth of the drag shares is set, the sliding surfaces of the runners assume a rearwardly elevated position, so that the seed furrows are no longer able to be closed to a sufficient extent.

The object of the invention is to enable the soil particles or cohering pieces of soil lifted by the disk furrow openers to fall back unturned into the seed furrows produced by the openers and thus achieve an uninterrupted closing of these furrows over the seeds deposited in them, doing so under all circumstances arising in field cultivation.

This object is achieved in accordance with the invention in that runners are disposed on the mountings in a manner known in itself in drag shares, and their sliding surface is situated above the bottommost share edge, and that these runners extend along the outer side of the individual share disks which is at an angle to the line of travel. As a result of these measures, the soil portions cut by the share disks are lifted so slightly upwardly that, on the one hand the turning of these portions is prevented, and on the other hand, due to the rotation of the share disk, they slide rearwardly a distance along the runner and fall back into the seed furrows behind the share disks.

Provision is furthermore made in accordance with the invention for the forward portion of each runner to be bent upward and forward in a known manner, and for it to terminate in the area between the axis of rotation and the forward portion of the circumference of the share disk. This brings it about that even in the case of thick vegetation, the share disks will cut into the soil unhindered and the runners will be able to slide easily over taller plants and press them under their sliding surfaces. At the same time it is especially advantageous if the acute angle of the edge of each runner adjacent the share disk is slightly greater than the acute angle between the share disk and the line of travel. This will exclude any clogging of the narrow gap between each share disk and each runner by bits of vegetation and therefore any seizing of the share disk, since such bits of vegetation will be cleared out of the downwardly flaring gap by the rotation of the share disk. Furthermore, by the measure of the invention, corresponding to which each runner is disposed adjustably with respect to the acute angle between its edge and the corresponding share disk, it is possible to adapt the angle of opening of this gap to existing conditions of vegetation.

The invention furthermore provides that the runners are disposed for adjustment in height without alteration of the attitude of their sliding surface toward the ground surface. This measure makes it possible to adjust the sliding surfaces of the runners to the distance from the soil surface that will be optimum for any depth of operation of the share disks established in any known manner, for example by means of a guiding wheel as in the case of the drill described in the beginning, and for any conditions of growth. Lastly, if the runners are disposed for variation with respect to the attitude of their sliding surface to the ground surface, the attitude of this sliding surface can be precisely adapted to the existing soil and vegetation conditions.

Figure 2:
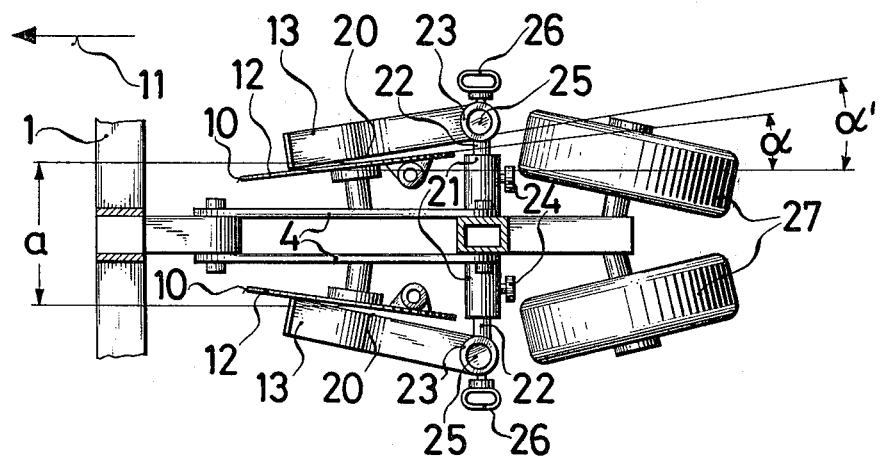

The invention will now be further explained with the aid of the appended drawing, wherein FIG. 1 is a partial longitudinal cross-sectional view of a seed drill in accordance with the invention, and FIG. 2 shows the arrangement of a disk furrow opener with its mounting in the cross section I—I.

The drill is equipped with a frame 1 on which a number of mountings 2 constructed in the mannner of a parallelogram are disposed for movement in a vertical plane. Each of these mountings 2 has two upper and two lower links 3, 4, running parallel to one another, whose forward ends are pivotally mounted at the pins 5 and 6 attached to the frame 1, and whose rearward ends are pivotally mounted on the upright mounting member 7. At the bottom of the mounting member 7 is the beam 8 on the forward end of which the disk furrow opener 9 is rotatably mounted. This disk furrow opener 9 consists of the two share disks 10 which are set V-wise to one another and adjusted at the acute angle α to the line of travel indicated by the arrow 11. Also, the share disks 10 have an average distance a from one another corresponding to the width of the rows of the seeds to be planted.

Closely adjacent to the outer sides 12 of the share disks 10, which are disposed at an angle to the line of travel 11, there are provided the runners 13 whose sliding surfaces 14 are situated above the bottommost cutting edge 15 and extend approximately parallel to the ground surface 16. To prevent weeds from catching on the runners 13, their front portion 17 is bent upward and terminated between the axis of rotation 18 of each share disk 10 and the forward portion 19 of the circumference of those disks. Also, the edge 20 of each runner 13 adjacent the share disk 10 is at and acute angle α' to the direction of travel 11, which is slightly greater than the acute angle between share disk 10 and the line of travel 11.

For the fastening of the runners 13 to the mounting 2, a tubular support 21 is welded to each side of the mounting member 7, and in it the stem 22 of a mounting sleeve 23 is disposed displacebly and rotatably and can be locked in place by means of the setscrew 24. The shank 25 welded to the runner 13 is also disposed rotatably and displaceably in the mounting sleeve 23 and can be locked in place by means of the ring setscrews 26.

As a result of this arrangement, each runner 13 can be infinitely adjusted in its height above the bottom edge 15 of the disk, without changing the attitude of its sliding surface 14 towards the ground surface 16. If, however, a change of this kind is desirable for the purpose of adaptation to existing soil and vegetation conditions, it is necessary only to loosen the setscrew 24 and turn the stem 22 slightly in the tubular support 21, and again lock it in the new position by means of the setscrew 24. It is furthermore possible by loosening the setscrew 24 and the ring setscrew 26 to shift the stem 22 in the tubular support 21 and turn the shank 25 in the mounting sleeve 23, so as to vary the acute angle α' between the edge 20 of runner 13 and the line of travel 11.

The depth of penetration of the disk furrow openers 9 in the soil is determined by the press wheels 27, each of which is rotatably disposed on the beam 8 at the rear of each share disk 10. For varying the depth of penetration, there is provided on frame 1 the adjusting spindle 28 by means of which the pin 5 of the upper link 3 can be shifted backward or forward in the line of travel 11, resulting in a tilting of the mounting member 7 and therefore in a change in the height of the press wheels 27 above the share disks 10.

As is shown in FIG. 1, the seed in the supply hopper 29 is fed at adjustable rates through the feeding mechanism 30 and the seed tubes 31 to the share disks 10. From thence the individual seeds 32 drop into the furrows 33 produced by the share disks 10. The soil portions 34 pushed laterally and upwards upon the production of the furrows, pass, together with the vegetation 35 thereon, beneath the sliding surfaces 14 of the runners 13 and are thereby prevented from turning over, so that, after this soil has fallen back into the seed furrows 33, the vegetation 35 will again be on the surface 16 of the ground.

The lifting of the mountings 2 with the disk furrow openers 9 and press wheels 27 mounted thereon from the working position represented in FIG. 1 to a transport position in which the share disks 10 and the press wheels 27 are at a greater distance above the ground surface 16 is accomplished through a known lifting means which has been omitted from the drawing for greater ease in comprehension.

I claim:

1. A drill comprising a frame, a disk furrow opener, a seed tube extending downwardly from the frame to terminate on the side of the disk furrow opener opposite the side opening the soil, mounting means joining the furrow opener to the frame, the disk furrow opener being rotatably mounted on the mounting means and being disposed at an acute angle alpha to the line of travel of the drill, the mounting means being movable in a verticle plane, a runner secured to the mounting means having a sliding surface disposed above the bottom edge of the disk and on the side of the disk opposite side on which the seed tube terminates, for enabling the soil particles or cohering pieces of soil lifted by the disk furrow opener to fall back unturned into the seed furrow produced by the furrow opener, the runner being disposed at an acute angle alpha' to the line of travel which is slightly greater than the acute angle alpha between the share disk and the line of travel, and means for controlling the depth of penetration of the furrow opener connected to the frame.

2. The drill of claim 1, wherein the forward portion of the runner is bent upward and forward and terminates in the area between the axis of rotation of the disk and the forward part of the circumference of the disk.

3. The drill of claim 1, comprising means for adjusting the angle alpha'.

4. The drill of claim 1, 2 or 3, comprising means for adjusting the runner in height without changing the attitude of its sliding surface with respect to the ground.

5. The drill of claim 4, comprising means for adjusting the runner with regard to the attitude of its sliding surface with respect to the ground.

6. The drill of claim 1, wherein one end of the runner is connected to the mounting means, the other end of the runner is free, the free end being disposed forward of said one end.

* * * * *